Jan. 4, 1949.  A. V. DE FOREST  2,458,354
ELECTRIC STRAIN DEVICE WITH TEMPERATURE COMPENSATOR
Filed Jan. 20, 1945
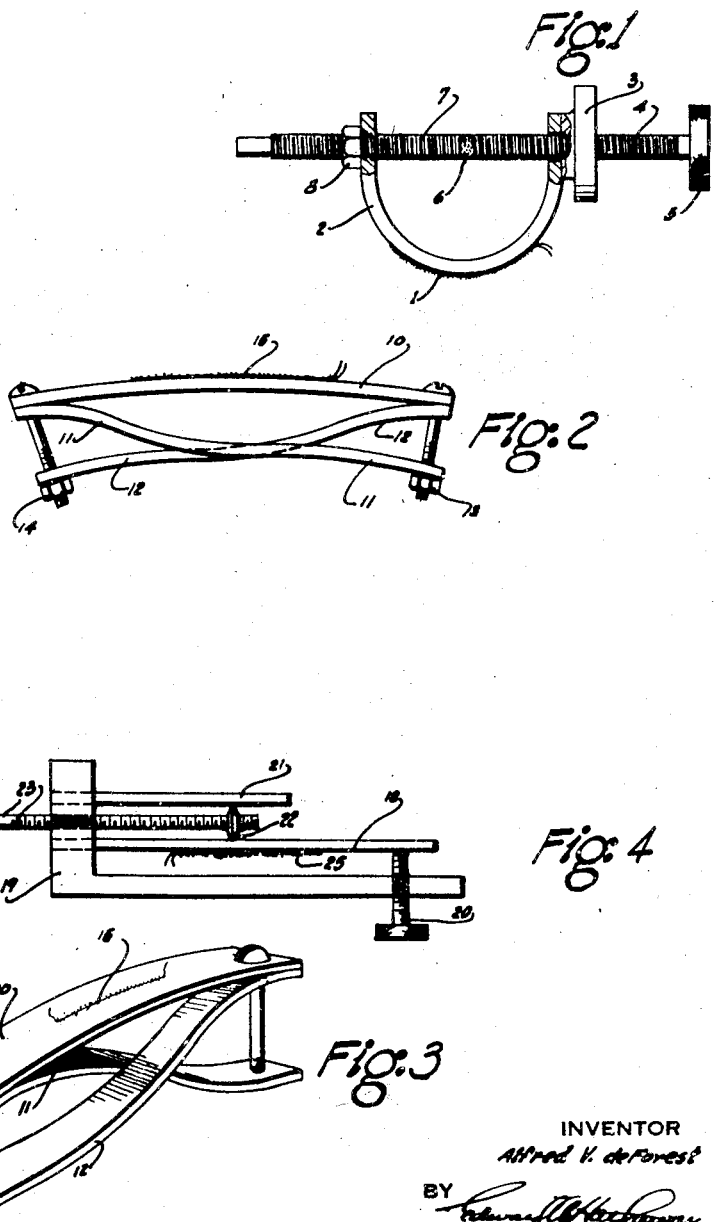

Patented Jan. 4, 1949

2,458,354

UNITED STATES PATENT OFFICE 2,458,354

ELECTRIC STRAIN DEVICE WITH TEMPERATURE COMPENSATOR

Alfred V. de Forest, Marlboro, N. H., assignor to The Baldwin Locomotive Works, a corporation of Pennsylvania Application January 20, 1945, Serial No. 573,801

20 Claims. (Cl. 201—63)

This invention relates generally to temperature compensating strain responsive apparatus and particularly to a temperature compensating resistor employing a bonded wire filament whose electrical resistance varies with strain although the invention is applicable to other uses, one example of which among others is force measuring devices.

It is an object of my invention to provide an electrical strain responsive device having an improved automatic temperature compensating action that eliminates the need for electrical compensating devices and circuits such for instance as dummy gages in a bridge or other circuit.

Another object is to provide particularly an improved resistor whose final setting of resistance may be obtained by adjusting the strain in the electrical conductor filament and in which temperature compensation may be made to zero or, if desired, to a positive or negative value whichever may be necessary in order to correct automatically for various temperature coefficients in other portions of a circuit. For instance, there may be certain electrical circuits with which it is desired to use a precision resistor whose resistance remains constant regardless of temperature changes but nevertheless the resistance value necessary for the particular conditions of the circuit would have to be determined by adjustment of the resistor. In other cases, the circuit as well as the resistor structure itself may have various temperature coefficients whose cumulative effects are desired to be compensated. Even though these effects are either positive or negative, compensation can still be effected with my improved resistor and it may be adjusted in order to accomplish the necessary degree of compensation after which it will be maintained automatically with temperature changes. The temperature coefficients which might be encountered are of expansion, resistance and modulus of elasticity and these coefficients might apply to the filament conductor as well as to the metallic structure of the resistor.

Thus it is seen that in the specific embodiments of my invention, I adjust both factors of final resistance setting and degree of temperature compensation by using a change of strain in the electrical conductor element. This strain and its temperature response is derived from either or both of the prominent changes which occur in metals as a result of changing temperature. These are, first, a change in dimensions measured by the coefficient of expansion, and second, a change in elastic modulus with temperature.

Another object is to provide an improved temperature compensating electrical strain responsive apparatus in which the compensating means is a self-contained mechanical part of the device and is adjustable in its degree of compensating action.

Other objects and advantages will be more apparent to those skilled in the art from the following description of the accompanying drawing in which:

Fig. 1 is a side elevation of one form of my improved resistor;

Fig. 2 is a side elevation of the modification employing the temperature coefficient of the modulus of elasticity of metals;

Fig. 3 is a perspective of Fig. 2; and

Fig. 4 is a side elevation of a further modification.

In Fig. 1 an impedance means specifically shown herein as an electrical resistance wire 1 is bonded by suitable cement throughout its effective length to the surface of a spring member 2 which is subject to changes in strain in response to changes of its curvature, this member being preferably relatively flat in cross-section. The nature of the wire and cement, as well as the action of electrical resistance of the bonded wire varying with strain, are all disclosed in Ruge Patent No. 2,321,322 and others, and hence further detailed description of same is not necessary here. The bonded wire preferably extends in the direction of maximum strain so as to have maximum change of resistance in response to changes of strain in member 2 when adjusted. The radius of curvature of the spring member 2 can be changed by means of a nut 3 threaded on a shaft 4 which extends freely through the right end of the member 2 having a knob 5. The shaft 4 as will be explained presently is soldered, welded or otherwise suitably secured at 6 to an extended shaft portion 7 which has threaded engagement with the left end of U-shaped member 2. A lock nut 8 secures the shaft 7 in position. By adjusting nut 3 the curvature of member 2 is changed thereby establishing the desired or final setting of resistance of conductor 1 to suit whatever resistance conditions may be required for the circuit in which the resistor is used.

To adjust for various temperature coefficients, the threaded shaft is composed of two parts 4 and 7 connected at their center 6 in the manner above mentioned. One end of the shaft, such as 4, is made, say, from Invar, a metal having substantially zero temperature coefficient of expansion. The other end of the shaft is composed of, say, duralumin, a metal having a large temperature coefficient of expansion, substantially larger than that of spring member 2 which may be composed of, say, brass. If now nut 3 is prevented from rotating while the knob 5 is rotated, a greater or lesser length of the duralumin end 7 of the shaft may be used between the two ends of member 1. Accordingly, as the temperature of the entire device changes the effective portion of the duralumin section 7 located between the two ends of member 1 will similarly change so as to maintain this member at a curvature such as to avoid any strains being induced therein by reason of temperature changes and thereby prevent change in resistance of conductor 1. It is, of course, assumed that the temperature of the entire device changes at such a slow rate as to be unaffected by local temperature variations among the different portions of the device.

It is evident that when the Invar portion 4 is moved inwardly entirely between the ends of member 1 so that only the Invar portion 4 serves to restrain the spring member 1, the temperature coefficient of the assembly then will be remarkably less than when the duralumin portion 7 of the shaft performs the same function. Thus it is seen that in my device the two adjustments of initial resistance and of temperature coefficient of the structure as a whole may be made substantially independently, first by adjusting nut 3 on its screw to bend member 1 to a predetermined curvature which produces an initial setting of resistance 2 and then adjusting knob 5 to vary the effective amount of temperature compensating material 7 between the ends of the spring 1.

If the arrangement of Fig. 1 is used as a dynamometer with the force applied to the opposite ends of the screw, the strain of member 2 may be precalibrated in terms of force applied. The temperature compensating action of the bi-metal screw will be thus superimposed upon the strain thereof which arises from transmission of a force through the screw. Broadly, the screw is a member so operatively connected to spaced portions of member 10 that the effective length of the bi-metal sections may be varied in accordance with the desired temperature compensation.

In another modification, I make use of the temperature coefficient of the modulus of elasticity of metals to accomplish the purpose of temperature compensation in a resistor. For example, as shown in Figs. 2 and 3, a spring member 10 is composed of steel for purposes of illustration, this member being preferably flat in cross-section as shown in Fig. 3. A spring 11 composed of elinvar or equivalent material having substantially zero coefficient of the modulus is firmly fastened to one end of spring 10. To the other end of spring 10 is firmly fastened a second spring 12 composed of a metal such as aluminum alloy, e. g. duralumin, having a large coefficient of modulus. Both of these springs are adapted to bend the strain responsive spring 10 by adjustment of two nuts 13 and 14 on screws extending through the ends of all three springs. If now both nuts 13 and 14 are moved in such a direction as to increase the tension in springs 11 and 12 the radius of curvature of strain responsive spring 10 will be changed and the initial resistance of the bonded resistor wire 15 mounted on spring 10 will change. The resistor 15 is similar in every respect to resistor 1. The foregoing adjustment of the nuts causes the radius of curvature of member 10 to be influenced by the relative modulii of the three metal members 10, 11 and 12, the coefficient for steel being approximately midway between that of springs 11 and 12.

If nut 13 is moved up on its screw the two right ends of members 10 and 11 are moved toward each other thereby causing spring member 10 to have a sharper curvature. Similarly, if nut 14 is moved upwardly on its screw, the same effect will be had on spring 10. Either one of these operations alone will establish the initial value of resistance 15.

Now, if a temperature change occurs member 10 changes in length and also in curvature inasmuch as the elinvar bar 11 does not change in stiffness, i. e. bending modulus. It will also be understood that the duralumin member 12 also changes in stiffness due to the foregoing assumed temperature changes, but not at the same rate as member 10. Therefore, the curvature of member 10 is controlled or modified by the action of duralumin member 12. It will, of course, be understood that the members 10, 11 and 12 act simultaneously to produce the final resultant curvature of member 10. If the relation of nuts 13 and 14 to each other and to their screws be again changed, the entire preceding description is valid but the shape of the resultant curve of member 10 is different under the same temperature change. In other words, if we change the initial resistance setting of resistor 14, as by adjusting nuts 13 and 14, then upon occurrence of a temperature change the member 10 will assume a different shaped curve from that described above although the same principles of operation thereof apply. Or put in another way, for each different setting of initial resistance of resistor filament 15 the member 10 will have a different shaped curve, even though the temperature change is the same in each instance.

Thus it is seen that I introduce a compensating strain change in member 10 which, when interpreted as a resistance change in the filament, is equal and opposite to the resistance change that would be caused by all factors entering into resistance change in a strain gage due to temperature.

Therefore, in the modification of Fig. 2 by successive adjustments of the two nuts 13 and 14 it is possible to influence both the initial resistance of the bonded resistor and the temperature coefficient of the resistor as a whole. While this construction does not allow an independent adjustment of initial resistance and of temperature coefficient, yet by proper successive adjustments of nuts 13 and 14, the necessary balance can be reached. Equivalent arrangements could be used employing the above principles of the Fig. 2 modification which broadly requires a strain responsive spring to which the resistance element is bonded and the curvature of which is influenced by either of two auxiliary loading springs, one of which has a temperature coefficient of modulus greater than that of the strain responsive spring and the other of which has a lesser temperature coefficient of mudulus.

In the modification shown in Fig. 4, a resistor filament is bonded to a spring 18 which functions as a strain responsive member mounted as a cantilever in a rigid frame 19. This spring may be bent by means of a screw 20 threaded in frame 19 and abutting against the free end of spring 18. A second cantilever spring 21 is also mounted in frame 19 in superimposed relation to spring 18 and substantially parallel to it. Spring 21 is composed of a piece of temperature-sensitive bi-metal formed as a unitary strip such as normally used in many thermostatic devices. As is wellknown such bi-metal strips are composed of two metals bonded together, one of which has a higher temperature coefficient of expansion than the other and will, therefore, change radius of curvature with temperature. This bi - metal cantilever 21 acts upon the spring 18 through a preferably sharpened edge spacer block 22 which may be formed rigidly on a screw 23 threaded in frame 19 whereby rotation of the screw by knob 24 will longitudinally adjust spacer 22 along the length of springs 18 and 21. Operation of the Fig. 4 modification the spacer block 22 is adjusted to a position that as the temperature of the entire assembly changes, the bi-metal cantilever 21 will change its radius of curvature to such an extent as to exactly compensate for any initial change in resistance of the bonded resistor element 25. If a zero temperature coefficient of resistance is not the one desired, then spacer block 22 is adjusted only until the desired temperature coefficient is reached. The resistor 25 is identical in construction and operation to the resistors 1 and 15 previously described and is applied to the under surface of 18. Obviously, by moving the spacer block 22 a greater or lesser amount, a desired change of curvature of strain responsive member 18 may be accomplished. When the spacer block is in a position that the full length of the bi-metallic element is active, there will be the greatest change of resistance with temperature. When the spacer block is moved to the left, the bi-metallic member has a decreasing influence on the curvature of the strain responsive member 18 as effected by changing temperature. This modification also enables an adjustment to be made of the initial resistance by means of screw 20 without substantially changing the adjustment of the temperature coefficient which is in greater part dependent on the position of spacer 22. This independence of adjustment is desirable for the rapid adjustment of the two variables.

From the foregoing disclosure of the several modifications, it is seen that I have provided a temperature compensating resistor in which compensation is effected mechanically by automatically adjusting the strain of a member which carries the resistor element whose electrical resistance varies with strain. The automatic mechanical adjustment of the strain responsive member in order to compensate for temperature changes is in distinction to prior art attempts to provide electrical temperature compensating means such as by inserting electrical dummy strain gages in arms of a Wheatstone bridge or circuit. My improved device makes the compensation entirely self-contained within the device itself and has the advantage of allowing in certain modifications independent adjustment of the desired, i. e., final resistance setting and of selecting any desired degree of temperature compensation particularly in the forms shown in Figs. 1 and 4 whereas in Fig. 2 the desired setting involves an interdependent operation with temperature compensation.

It will of course be understood that various changes in details of construction and arrangement of parts may be made by those skilled in the art without departing from the spirit of the invention as set forth in the appended claims.

I claim:

1. In combination, a member adapted to be strained, an electrical conducting filament whose resistance varies with strain connected to said member so that a change of strain therein is transmitted to said filament thereby to vary its resistance, temperature compensating means for controlling the strain of said member automatically in accordance with temperature changes, and means for varying the compensating action of said temperature compensating means.

2. The combination set forth in claim 1 further characterized by the provision of means for selectively adjusting the strain in said member and accordingly establish the initial resistance of the filament.

3. The combination set forth in claim 1 further characterized by the provision of means for adjusting the initial setting of strain of said member independently of the automatic temperature control means and thereby establish the initial resistance of the filament.

4. In combination, a member adapted to be strained, a filament of material whose electrical resistance varies in accordance with strain, means for bonding said filament throughout its effective length to said member so that the strain therein is transmitted to said filament to vary its resistance, and temperature responsive mechanical means adapted to control the strain of said member automatically in accordance with temperature changes.

5. In combination, a member adapted to be strained, a filament of material whose electrical resistance varies in accordance with strain, means for bonding said filament throughout its effective length to said member so that the strain therein is transmitted to said filament to vary its resistance, and means for varying the strain of said member automatically in accordance with temperature changes so that a predetermined relation between temperature and resistance is maintained.

6. In combination, a member adapted to be strained, an electrical conducting filament whose resistance varies in accordance with strain bonded throughout its effective length to said member so that the strain therein is transmitted to said filament thereby to vary its resistance, and means constituting a unitary structure with said member and adapted to control said member in accordance with temperature changes so that the strain change of said member due to mechanical deformation of the unitary structure is in constant ratio to the strain change in the member due to temperature change.

7. The combination set forth in claim 6 further characterized in that said automatic temperature compensating means is adapted also to establish an initial setting of the filament resistance whereby such means is operative to commonly and simultaneously perform said multiple functions.

8. In combination, a member adapted to be strained, an electrical conducting filament whose resistance varies with strain bonded throughout its effective length to said member so that a change of strain therein is transmitted to said filament thereby to vary its resistance, temperature responsive means adapted to mechanically adjust said member to change the strain thereof to compensate for its coefficient of expansion, and means for mechanically varying the compensating action of said temperature compensating means.

9. In combination, a member adapted to be strained, an electrical conducting filament whose resistance varies with strain bonded throughout its effective length to said member so that a change of strain therein is transmitted to said filament thereby to vary its resistance, an element connected to said member and whose expansion is such in response to temperature changes as to mechanically adjust said member to change the strain thereof to compensate for the expansion of said member under the same temperature change, thereby to render the resistance of said filament substantially free of thermal expansion in said member, and means for mechanically varying the compensating action of said element.

10. In combination, a member adapted to be strained, an electrical conducting filament whose resistance varies with strain bonded throughout its effective length to said member so that a change of strain therein is transmitted to said filament thereby to vary its resistance, and temperature compensating means including a bi-metallic member for controlling strain in said member in accordance with temperature changes.

11. The combination set forth in claim 10 further characterized in that said temperature compensating means includes means for varying the compensating action of the bi-metallic member on the member to which the filament is bonded.

12. The combination set forth in claim 10 further characterized in that the bi-metallic member overlies the member to which the filament is bonded, and means are adjustable longitudinally of the bi-metallic member to vary the extent of its action on the filament.

13. The combination set forth in claim 10 further characterized by the provision of means for adjusting the strain of the filament thereby to establish the desired resistance setting of the resistor.

14. The combination set forth in claim 10 further characterized in that the filament and bi-metallic member are in the form of cantilevers with their bases disposed at the same end and overlying each other, and means interposed between the bi-metallic member and filament and engageable with each of the same at any longitudinal position thereof thereby to transmit any desired degree of compensating force from the bi-metallic member to the filament.

15. In combination, a member having an initial shape which varies when strained by changes in temperature, an electrical conducting filament whose resistance varies with strain bonded throughout its effective length to said member so that a change of strain therein is transmitted to said filament thereby to vary its resistance, and means connected to said member to control the strain change therein so that compensation for the temperature coefficient of the modulus of electricity of said member automatically is made in accordance with temperature changes.

16. The combination set forth in claim 15 further characterized in that the compensating means is also adapted to selectively adjust the strain of the member to which the filament is bounded thereby to establish an initial setting of the resistance.

17. The combination set forth in claim 15 further characterized in that said compensating means also compensates for the temperature coefficient of expansion of the member to which the filament is bounded and of the compensating means itself.

18. The combination set forth in claim 15 further characterized in that the compensating means includes at least two elements whose temperature coefficients of the modulii of elasticity are different from each other and from that of the member to which the filament is bonded, whereby the compensating action is influenced by the relative modulii of elasticity of said member and elements.

19. The combination set forth in claim 15 further characterized in that said compensating means includes a pair of springs respectively rigidly connected at one of their ends to the respective ends of the member to which the filament is bonded, and means for adjustably connecting the other ends of the compensating members to the opposite ends of said member.

20. In combination, a member adapted to be strained, electrical impedance means whose impedance varies with strain secured to said member so that a change of strain therein varies the impedance, an element formed of bi-metallic portions, and means operatively connecting said element to spaced portions of said member so that the extent of one bi-metal portion or the other of the element may be variously disposed between said spaced portions to effect a predetermined degree of temperature compensating action.

ALFRED V. DE FOREST.

REFERENCES CITED

The following references are of record in the file of this patent:

UNITED STATES PATENTS

| Number | Name | Date |
|---|---|---|
| 2,292,549 | Simmons | Aug. 11, 1942 |
| 2,336,500 | Osterberg | Dec. 14, 1943 |

OTHER REFERENCES

Roberts, "Electrode Gaging Methods," in Instruments, page 605, October, 1944.

Wilson et al., Temperature Coefficient for Proving Rings, July, 1946, R. P. 1726, Bureau of Standards.